March 29, 1966     G. HANNAUER, JR., ET AL     3,243,488
METHOD OF PERFORATING THERMOPLASTIC SHEETS
Original Filed July 6, 1962

INVENTORS.
George Hannauer, Jr.
Earl M. Grimes
Charles H. Schaar
James J. Jewett Atty.

March 29, 1966   G. HANNAUER, JR., ET AL   3,243,488
METHOD OF PERFORATING THERMOPLASTIC SHEETS
Original Filed July 6, 1962   3 Sheets-Sheet 3

INVENTORS.
George Hannauer, Jr.
Earl M. Grimes
Charles H. Schaar
James J. Fawcett Atty.

United States Patent Office 3,243,488
Patented Mar. 29, 1966

3,243,488
METHOD OF PERFORATING THERMOPLASTIC SHEETS
George Hannauer, Jr., La Grange, Ill., Earl M. Grimes, Franklin, Ky., and Charles H. Schaar, Chicago, Ill., assignors to The Kendall Company, Boston, Mass., a corporation of Massachusetts
Original application July 6, 1962, Ser. No. 208,040. Divided and this application Oct. 1, 1964, Ser. No. 406,652
5 Claims. (Cl. 264—284)

This is a division of copending application Serial No. 208,040, filed July 6, 1962.

This invention is concerned with perforating methods designed to perforate faced thermoplastic adhesive tapes without perforating the facing. In the past, various methods have been proposed for perforating plastic pressure-sensitive adhesive tapes, some of which have utilized hot needles and some of which have used die punching methods, but none of the methods previously employed have utilized the principles employed in the methods of this invention.

It is an object of this invention to provide a method which will rapidly and consistently perforate plastic adhesive tapes without perforating the adhesive-protective facing thereon.

It is a second object of this invention to provide a method which will consistently perforate only through the backing and adhesive of faced plastic adhesive tapes without forming incompletely perforated areas where the holes are covered by thin veils of backing material.

Referring to the drawings:

In FIGURE 1 is shown an assembled side view of the perforating device.

Figure 1:
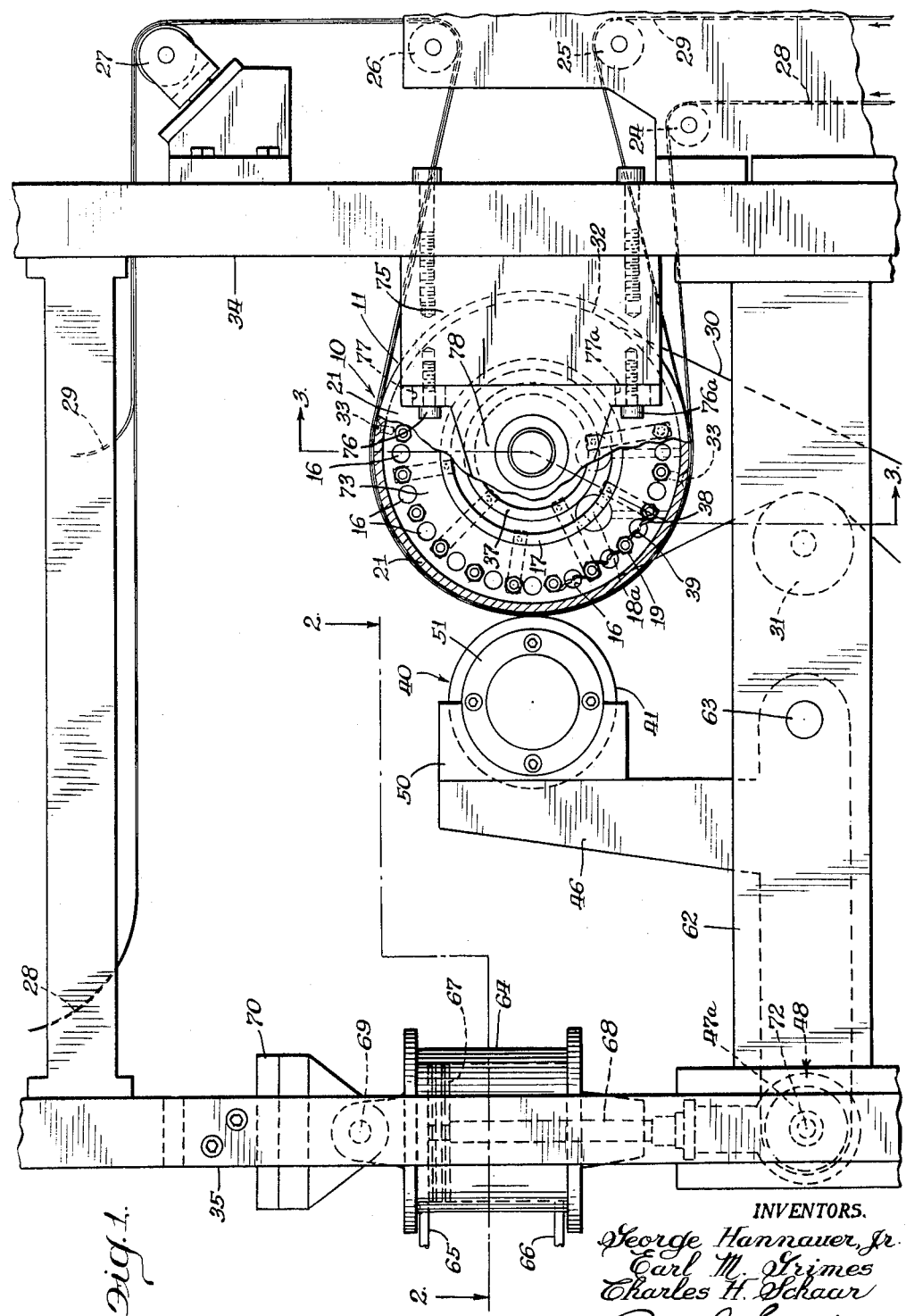

One of the problems associated with the perforation of thermoplastic adhesive tapes without perforating the adherent facing is that of variations in the machine direction in thickness of the facing and of the tape. Both the adhesive tape and the facing normally exhibit some variation in thickness. A perforating system with a nip gap adjustment which will achieve perforation where the adhesive tape is relatively thinner and the facing relatively thicker will not achieve perforation with the same nip gap where the adhesive tape is relatively thicker and the facing relatively thinner.

Another of the problems is the necessity for constant alignment of the nip elements of the two rolls in parallel relationship with the opposite sides of the facing sheet. This is especially critical because unless near perfect parallelism exists at the nip between the raised portions of the pattern roll and one side of the facing and the surface of the hot roll and other side of the facing, uniformity in perforation across the width of the adhesive tape will be impossible. For instance, if the nip elements are not respectively parallel to the sides of the facing sheet they cannot be the proper distance apart for perforation of the tape adhered to the facing except in one small area. On either side of this area or on one side if the area occurs at the end, perforations will occur in the adhesive but the backing will only be embossed and thinned where the perforations should be.

Similarly, where a sheet in addition to the faced tape is interposed between the rolls, the variation in thickness which may exist across the material in the nip and lengthwise thereof is further amplified.

This invention, therefore, provides means for constantly adjusting the nip both with respect to nip gap distance and to parallelism or minor departures from parallelism of the nip elements of the two rolls to accommodate the variations in thickness of the material in the nip.

The embodiment illustrated in the drawings provides a pattern roll whose adjustable bearings may be moved at either or both ends and locked so that its nip elements are in the same plane as the nip elements of the hot roll. The hot roll continuously and automatically adjusts itself so that its nip element parallels the nip element of the pattern roll or departs somewhat from parallelism depending upon the nip contents. This is accomplished in the illustrated embodiment by fluid pressure exerted through a ball joint at the mid-point of a pressure shaft. This shaft swivels about the central ball joint and causes independent movement of pivoted pressure arms through ball joints at each end. The pressure arms pivoting about a common shaft act upon the respective end hub shafts of the hot roll through spherical ball bearings and constantly urge the hot roll ends toward the pattern roll while the machine is in operation.

Figure 2:
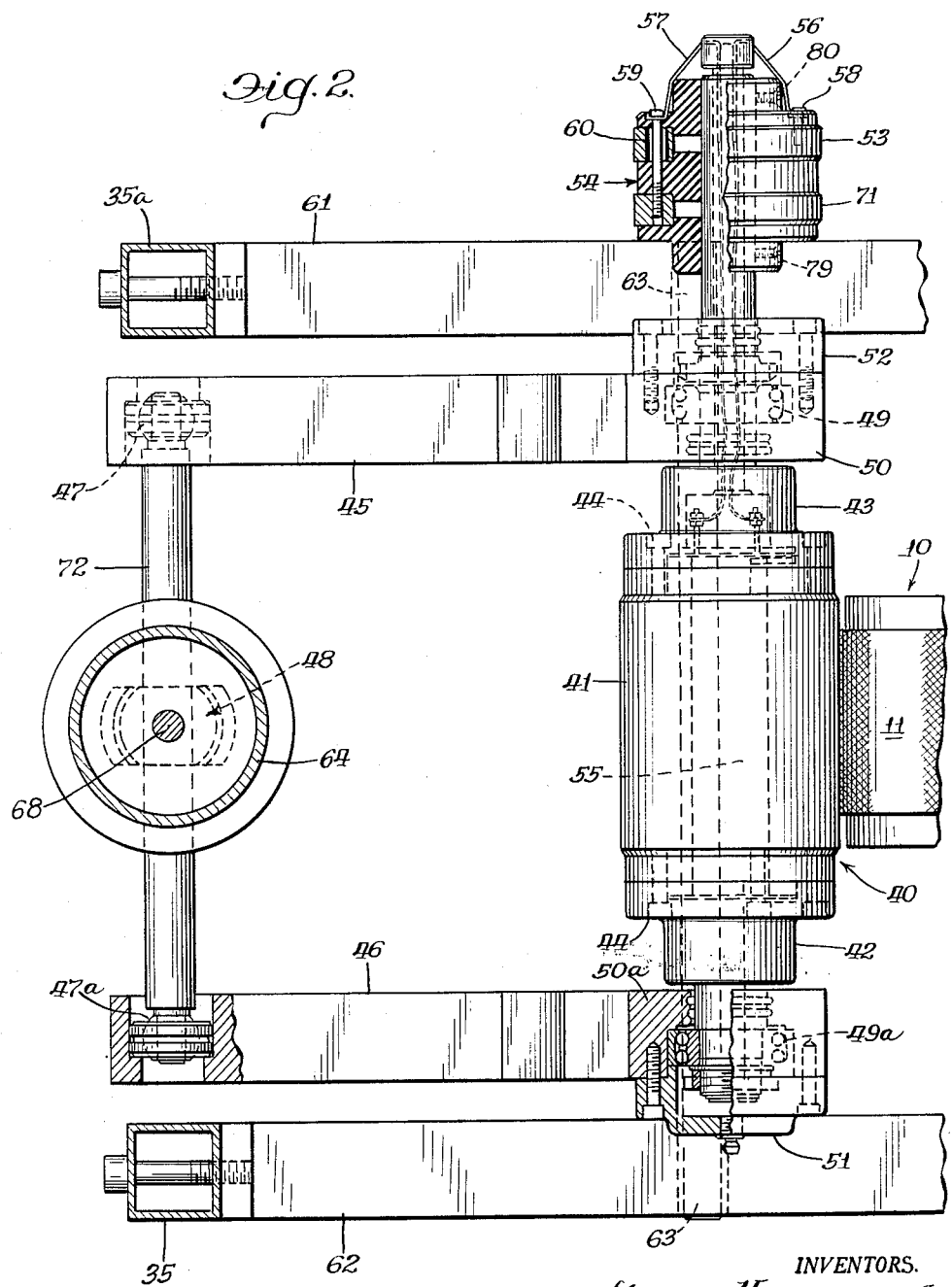
FIGURE 2 is the top view of the hot roll and its aligning and supporting structure.
Figure 3:
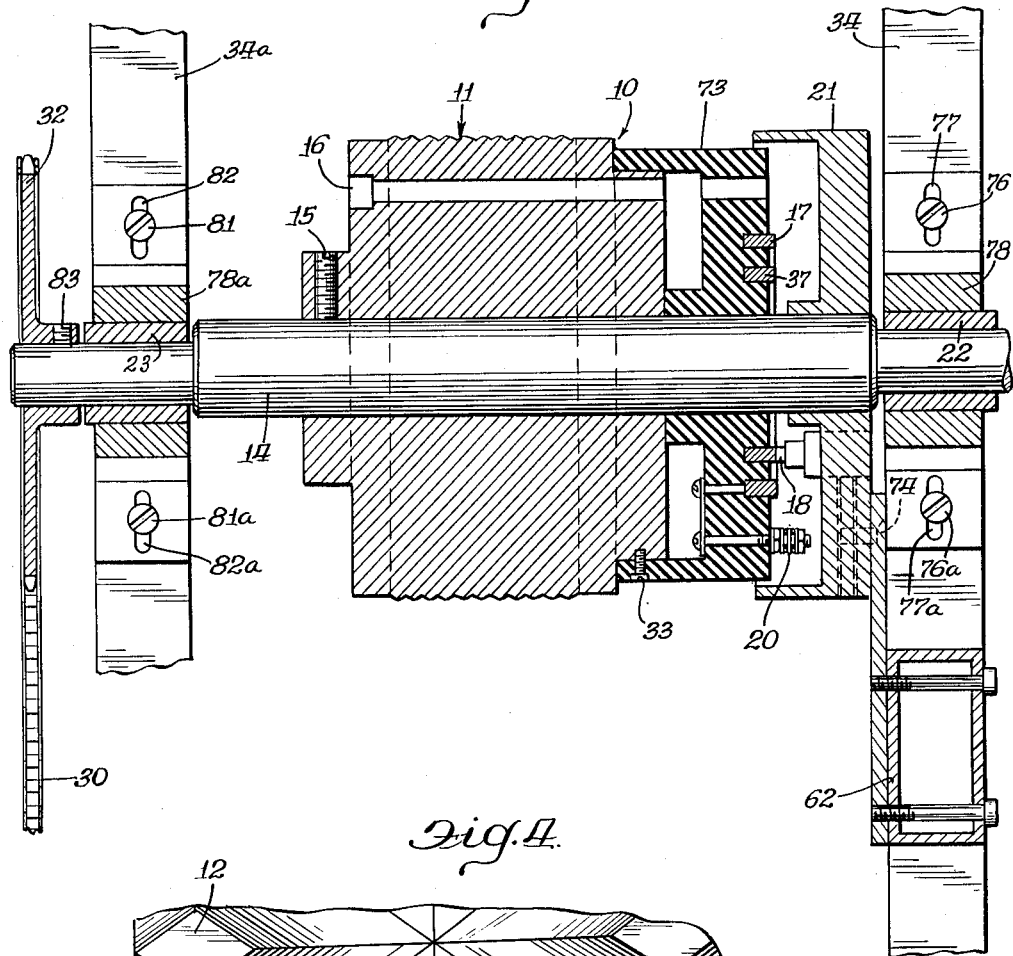
FIGURE 3 is a cross-sectional view of the pattern roll of the device.

Referring once more to the drawings: In FIGURES 1 and 2, the pattern roll 10, shown in cross-section in FIGURE 3, has a pattern surface 11, FIGURE 4, comprising cylindrical portions forming pattern plateaus 12 surrounded by slopes terminating in pattern valleys 13. The pattern roll drive shaft 14 rotates in bearings 22 and 23 in adjustable bearing housings 78 and 78a. The adjustable features of the pattern roll bearing housings are shown in FIGURE 3. Bearing housings 78 and 78a are equipped with slotted bolt holes 77 and 77a and 82 and 82a, respectively. It is obvious that either or both ends of the pattern roll may be shifted by loosening the bolts 76, 76a, 81 and 81a and shifting the roll and tightening the bolts again to bring the nip elements of the rolls in the same plane. Spacer elements 75 at either end to which the bearing housings are bolted are in turn bolted to frames 34 and 34a, FIGURE 1. The set screw 15, FIGURE 3, rigidly attaches the pattern roll to the drive shaft 14. A hole for the heaters 16 of which there may be 20, more or less is illustrated. The heaters have their terminals 38 and 39, FIGURE 1, attached to slip rings 17 and 37 on insulation terminal and slip ring block 73, FIGURE 3, through terminal posts 20 and connective posts 19. Two heaters are thus connected in series and the pairs of heaters are in parallel electrically. Brushes 18 and 18a are carried in cover and brush holder cap 21 which is fastened to the frame 62 by bolt 74. Idler rollers 24, 25, 26 and 27 are used for feeding the faced tape 28 and the interposed sheet 29 and for carrying them away from the perforator. Drive chain 30 drives a sprocket 32, FIGURES 1 and 3, and is tightened by chain tightener sprocket 31 which is adjustable. Sprocket 32 drives the pattern roll drive shaft, being fastened to the latter by set screw 83. Vertical frames 34, 34a, 35 and 35a and horizontal frames 61 and 62 support the perforating mechanism.

Figure 4:
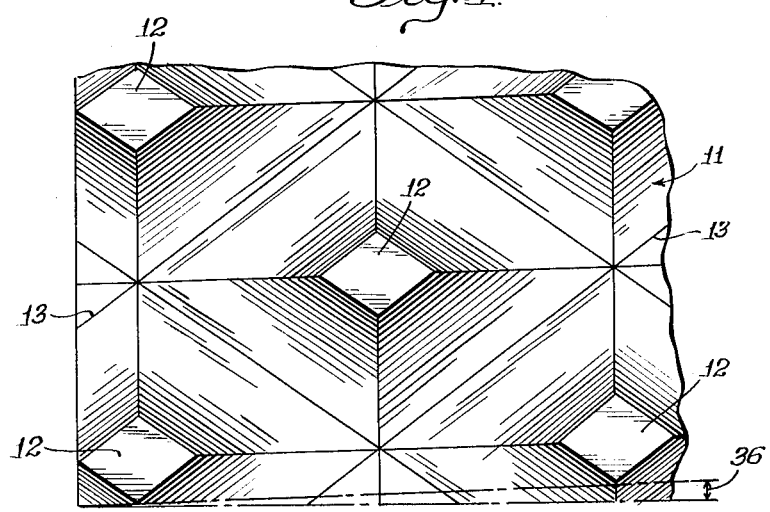
FIGURE 4 is an enlarged view of a portion of the pattern roll surface.

In the pattern face of the pattern roll, the perforated raised portions 12 lie in parallel rows which are offset angularly from the pressure line between the two rolls. This angle 36, FIGURE 4, is necessary in order to insure a reasonable constant pressure line between the cylindrical raised areas 12 of the pattern roll and the hot roll as the film moves between the two rolls. In the absence of such offset, the hot roll drops off into each valley and then rises to the next row of raised areas so that excessive wearing of the raised pattern occurs. It has been found that a very desirable offset, across the roll face, is about the distance between adjacent raised faces on the same circumferential line so that the nip elements of the pattern roll intersect at least two rows of raised pattern areas.

The hot roll 40 consists of a heater roll sleeve 41 and two hub shafts 42 and 43 all of which are bolted together by bolts 44. The heater roll sleeve is hollow and contains the heater 55. Wires 56 and 57 from the heater terminals pass out through the hollow portion of the hub shaft 43 and are fastened respectively to slip rings 53 and 71 in insulation assembly 54 by screws 58 and 59, the latter passing through insulation ring 60. The insulation assembly 54 consists of three insulation rings held together by set screws 79 and 80 which lock the assembly to the hub shaft 43 and hold the slip rings in place. Stationary brushes attached to the bearing housing carry the current to the heater and make sliding contact with the slip rings. At opposite ends of the hot roll assembly are spherical ball bearings 49 and 49a which support the hot roll in the bearing housings 50 and 50a. These bearings are protected by bearing end cap 51 and bearing cover 52. Bearing housings 50 and 50a in turn are bolted to hot roll pressure arms 45 and 46 which are pivoted between frame members 61 and 62 by pivot shaft 63. The ends of the hot roll thus pivot about the pivot shaft 63 and move toward and away from the pattern roll depending upon the position of the pressure arms 45 and 46. The pressure arms in turn are actuated by the piston 67 in fluid cylinder 64 which has fluid ports 65 and 66 and is supported by horizontal member 70 by means of pivot pin 69. The piston 67 is moved in the cylinder depending upon which of the ports is acting as an entrance port and which is acting as an exhaust port. Piston rod 68 is fastened to spherical rod end bearing 48 through which hot roll pressure shaft 72 passes. Hot roll pressure shaft 72 in turn is fitted at its ends with spherical bearings 47 and 47a which engage the pressure arms 45 and 46. When fluid enters the port 65 and exhausts from port 66, the spherical end bearing 48 forces the shaft 72 downwardly and causes the pressure arms 45 and 46 to rotate counterclockwise, as shown in FIGURE 1, about the pivot shaft 63 thus drawing the hot roll away from the pattern roll. When, however, the fluid under pressure enters port 66 and exhausts from 65 forcing the piston 67 upwardly as shown in FIGURE 1, the hot roll pressure shaft 72 is also forced upwardly and the pressure arms 45 and 46 pivoting around pivot shaft 63 force the hot roll against the material separating it from the pattern roll. The combination of spherical bearings 47, 47a, spherical rod end bearing 48 and spherical ball bearings 49 and 49a cause the hot roll surface to press against the interposed material across its width uniformly regardless of normal web thickness variations. Thus, if the axis of the hot roll is not parallel to the surface of the interposed material, the pressure arm on the non-contacting side causes the hot roll to pivot about its contact point with the material and move toward the pattern roll until contact across the roll is achieved.

Referring once more to the pattern roll 10 and particularly to the surface 11, it is obvious that the diamond shape of the raised cylindrical portions constituting plateaus 12 of the roll is shown only for purposes of illustration. The raised cylindrical portions may take any shape or size or any combination of shapes and sizes. The raised portions may be circular or oval or square or triangular or they may be in the form of complicated designs such as lacework designs. Generally, the area of perforation is in the range of 1 to 15% of the total tape surface area. Obviously, where the perforations are small, a large number may be made in a small space. With holes constituting 6% of the surface area as many as 450 to 500 holes per square inch may be formed without difficulty.

With regard to the depth of the valleys 13, it has been found that if the depth is as much as 1½ times the thickness of the material in the nip including the tape backing thickness, the adhesive thickness, the adhesive protective sheet facing thickness and the sheet thickness interposed between the pattern roll and the faced tape, excellent perforation of the tape but not the facing occurs. The angle of slope from the plateaus to the valleys is not critical providing the actue angle between the tangents to the raised surface and the slope line is at least 30° where the slopes commence. A 90° angle is satisfactory but not preferred.

With regard to temperatures of the hot roll, it is preferred to operate the hot roll at a temperature of 600° F. although this temperature may be altered considerably depending upon the material to be perforated. At this temperature, the pattern roll becomes heated to a temperature of 180–200° F. after several hours of operation. To make the conditions as constant as possible, therefore, the pattern is warmed to 180° to 200° F. before operations are commenced. Heaters should be selected to maintain the above temperatures depending upon the size of the rolls and the speed and thickness of the material through the machine.

The preferred embodiment of the method of operation is illustrated in the drawings. In this preferred embodiment, the hot roll is the smooth roll, while the pattern roll is fixedly adjusted so that the two rolls have their nip elements in the same plane. The hot roll is the roll whose ends are adjusted to adjust the nip gap and nip parallelism. However, it is obvious that all of the adjustable features could be assigned to one roll or could be reversed from the preferred machine without departing from the invention. Thus, the hot roll could be fixed and all of the adjustments made to the pattern roll or vice versa. Likewise, the hot roll could be fixedly adjusted so that the nip elements are in the same plane and the pattern roll could have its ends moved to adjust the nip gap and nip parallelism. Likewise, the hot roll could be the pattern roll.

By the preferred method, the tape, faced preferably with cellophane, is placed facing toward the hot roll while a sheet of polyethylene is interposed between the tape backing and the pattern roll. The hot roll does not affect the cellophane facing but the heat is passed through the facing to the adhesive and to the backing. Both backing and adhesive soften in the areas where the hot roll presses the material in the nip against the raised pressing surfaces of the pattern roll. The pressure squeezes out the softened adhesive and backing onto areas of less pressure thus creating perforations.

It is obvious that the mechanism useful in carrying out the method of this invention is not dependent for operation upon its position in space and the location of particular elements in horizontal, vertical or other positions is a matter of choice well within the scope of the invention.

The pressure which is exerted on the hot roll is preferably fluid pressure but other means such as springs and weights may be utilized.

In perforating an adhesive tape with a 3 mil backing of a copolymer of vinyl acetate and vinyl chloride, a quite common tape, the pressure of the fluid means may vary from 15 to 45 pounds per square inch depending upon the area of the perforations. Translated into force in the nip area, this amounts to approximately 50 to 150 pounds per linear inch of nip length. Thicker materials and materials with higher softening points may require more pressure. Thus, a force per linear inch of approximately 100 to 300 pounds is utilized in perforating 5-mil cellulose acetate cloth-backed adhesive tape.

Products of the general type produced by the methods of this invention are described and claimed in a patent application Charles H. Schaar, Serial No. 48,225, filed August 8, 1960, now U.S. Patent No. 3,073,304 issued January 15, 1963.

We claim:

1. A method of perforating thermoplastic adhesive tape faced with a removable heat conductive flexible sheet substantially unaffected by temperatures softening both the adhesive and the backing of said tape, comprising selecting a rotatable pattern roll having a surface consisting of raised cylindrical pressure receiving areas surrounded by depressed areas, fixing the axis of said roll so that the nip elements of its pressure receiving areas are in the same plane as the nip elements of an adjacent rotatable hot roll, introducing said adhesive tape into the nip between said rolls with its facing towards the hot roll and its backing separated from the pattern roll by an interposed flexible sheet of low conductivity, applying fluid pressure to a piston movable between fluid ports in a cylinder to cause movement of a piston rod, ball-jointed to the mid-portion of a pressure shaft, movement of said shaft causing responsive movement of pressure rocker arms each individually pivoting about a pivot shaft causing movement in turn of the ends of the hot roll shaft in spherical ball bearings resulting in movement of the hot roll toward the pattern roll whereby the hot roll axis varies from parallelity with the axis of the pattern roll to parallelity with the most adjacent surface of said facing and said faced adhesive tape and said interposed sheet are gripped with positive pressure the length of the nip between the hot roll and the pressure receiving areas of the pattern roll, positively driving the pattern roll, the temperature of said hot roll being sufficient to soften said adhesive tape and the pressure of said fluid being sufficient to squeeze out the adhesive tape adhesive and backing from the area between said hot roll and said pressure receiving areas of said pattern roll during passage of said tape through said nip whereby holes are produced corresponding roughly to the shape and size of said pressure receiving areas of the pattern roll.

2. The method of claim 1 wherein the adhesive tape has a backing of a copolymer of vinyl acetate and vinyl chloride, the facing is cellophane and the interposed sheet is polyethylene.

3. The method of claim 2 wherein the hot roll is heated to a temperature of about 600° F., the pattern roll is heated in the range of 150 to 210° F. and the speed of perforation is in excess of 10 yards per minute.

4. The method of claim 3 wherein the fluid pressure is caused by compressed air which exerts a force at the nip in the range of 50 to 150 pounds per linear inch of nip length.

5. A method of perforating a thermoplastic adhesive tape faced with a removable heat conductive flexible sheet having a higher softening point than said adhesive tape, comprising passing said faced adhesive tape between a rotatable relatively smooth roll and a rotatable pattern roll one of which is positively driven and one of which is hot, said pattern roll having raised pressing areas constituting rigid cylindrical surface portions surrounded by depressed areas, said adhesive tape having its faced side against the smooth roll and having its plastic backing separated from the pattern roll by an interposed flexible sheet, one of said rolls having a fixed axis parallel the axis of the other roll when the rolls are in surface contact forming a nip, said other roll having a movable axis varying between parallelity with said fixed axis of the fixed axis roll and parallelity with the most adjacent surface of the material interposed between the rolls, applying fluid pressure to a piston movable between fluid parts in a cylinder to cause movement of a piston rod, ball-jointed to the mid-portion of a pressure shaft, movement of said shaft causing responsive movement of pressure rocker arms each individually pivoting about a pivot shaft causing movement in turn of the ends of the shaft of the movable axis roll in spherical ball bearings resulting in movement of the movable axis roll toward the fixed axis roll whereby said faced adhesive tape and said interposed sheet are gripped with positive pressure the length of the nip between the smooth roll and the pressure receiving areas of the pattern roll, the temperature of said hot roll being sufficient to soften said adhesive tape between its facing and the interposed sheet and the pressure of said fluid being sufficient to squeeze out the adhesive tape adhesive and backing from the areas between said hot roll and said pressure receiving areas of said pattern roll during passage of said tape through said nip whereby holes are uniformly produced across said tape corresponding roughly to the shape, size and extent of said pressure receiving areas of the pattern roll.

No references cited.

ROBERT F. WHITE, *Primary Examiner.*

S. A. HELLER, *Assistant Examiner.*